United States Patent [19]

Tamminen

[11] Patent Number: 5,066,555
[45] Date of Patent: Nov. 19, 1991

[54] CONTACT ARRANGEMENT FOR A GALVANIC BATTERY

[75] Inventor: Pentti J. Tamminen, Espoo, Finland

[73] Assignee: Sporax Oy, Helsinki, Finland

[21] Appl. No.: 797,763

[22] Filed: Nov. 13, 1985

Related U.S. Application Data

[63] Continuation of Ser. No. 653,485, Sep. 21, 1984, abandoned, which is a continuation of Ser. No. 368,540, Apr. 15, 1982, abandoned.

[30] Foreign Application Priority Data

Apr. 27, 1981 [FI] Finland .................................. 811312

[51] Int. Cl.$^5$ ........................ H01M 6/46; H01M 2/24
[52] U.S. Cl. .................................. 429/121; 429/152; 429/158; 429/162; 429/180
[58] Field of Search ............... 429/121, 152, 157, 158, 429/170, 180, 159–162

[56] References Cited

U.S. PATENT DOCUMENTS 4,505,996 3/1985 Simmonton .................. 429/159 X
4,525,439 6/1985 Simonton ........................ 429/162

Primary Examiner—Stephen J. Kalafut
Attorney, Agent, or Firm—Wolf, Greenfield & Sacks

[57] ABSTRACT

Described herein is a contact arrangement for a battery cell of a galvanic battery. The battery cell comprises a positive mass layer (6, 106) and a negative electrode layer (11, 111). A separator layer (5, 105) separates the positive mass layer (6, 106) and the negative electrode layer (11, 111) from each other. A positive current collector (7, 107) is connected to the positive mass layer (6, 106). A case (1, 2, 101, 102) made of an insulating material hermetically encloses the active components of the battery cell. Contact units (12, 14, 16, 22, 23, 24, 116) create electrical contact through the case (1, 2, 101, 102) with the positive current collector (7, 107) and with the negative electrode layer (11, 111), respectively. An additional insulation layer (9, 13, 113) made of a tough and adhesive material and bounded by the case (1, 2, 101, 102) is provided so as to maintain the hermetic nature of the case despite the passing-through of a contact unit (12, 14, 16, 22, 23, 24, 116). According to the invention, the additional insulation layer (13, 113) is at least on the negative side of the cell disposed on the outer face of the case (1, 2, 101, 102) so that the contact unit (16, 23, 24, 116), when passing through the case (1, 2, 102), first penetrates through the said additional insulation layer (13, 113).

11 Claims, 8 Drawing Sheets b ≧ a

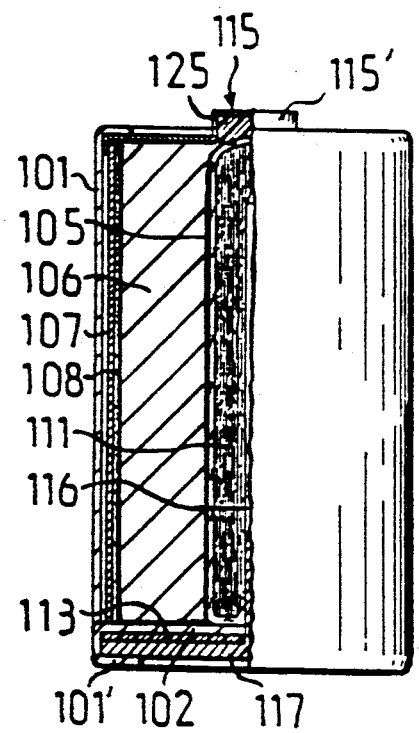
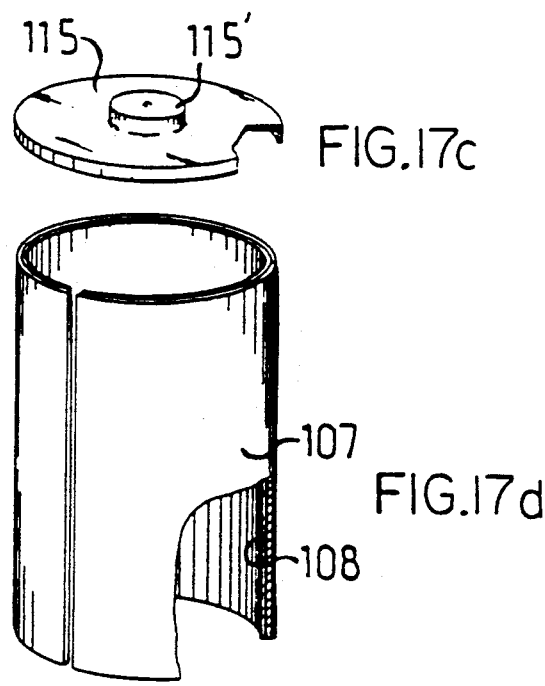
FIG.17c
FIG.17d
FIG.17a
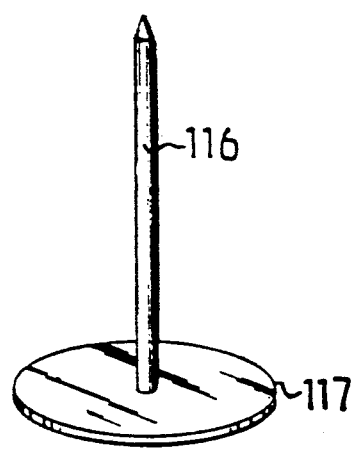
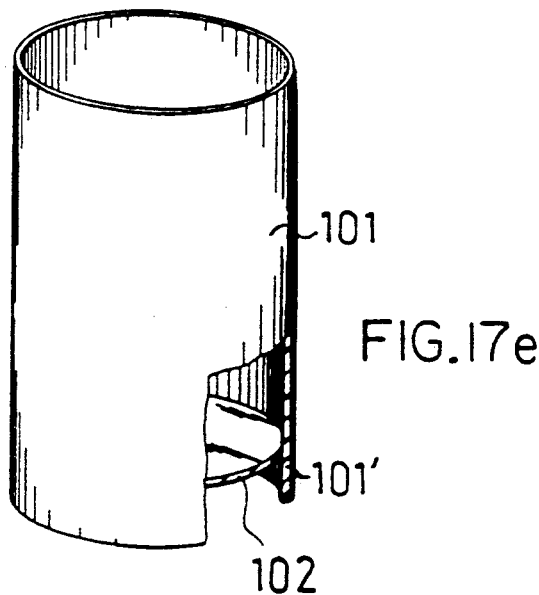
FIG.17e
FIG.17b

CONTACT ARRANGEMENT FOR A GALVANIC BATTERY

This application is a continuation, of application Ser. No. 653,485, filed Sept. 21, 1984 now abandoned; which is a continuation of Ser. No. 368,540 filed Apr. 15, 1982, now abandoned.

BACKGROUND OF THE INVENTION

The present invention concerns a contact arrangement for a battery cell of a galvanic battery.

Galvanic batteries which contain a corroding electrolyte must be so tightly sealed that the electrolyte cannot leak out of the cells under any circumstances of operation, thereby causing damage to the apparatus employing the battery as a source of energy. The most usual reason for leakage of electrolyte in galvanic batteries is inadequate sealing at the point where the negative current collector terminal passes through the layer of insulating material functioning as the case of the battery cell.

In the Finnish Patent Publication 49,090 (U.S. Pat. No. 4,060,670) a contact assembly is described that totally excludes any electrolyte leakage, said contact assembly being based on the idea that a rigid metal plate is an essential part both in the positive and in the negative current collector, which metal plate is placed inside the case of the battery cell and which is, at the point where a contact member passes through the case of the battery cell, coated with a tough insulating material tightly adhering to the inside face of the case. Electrically conductive contact to these metal plates connected to the electrodes has been achieved by means of springs placed outside the battery cell and passing through the case of the battery cell as well as through the said layer of sealing material, being pressed tightly against the said metal plates. This contact assembly is usable and reliable, but automation of the production of batteries based on this idea has proved difficult. Moreover, it has been noticed that, especially in the case of small batteries, this contact system requires an unduly

SUMMARY OF THE INVENTION

The object of the present invention is to eliminate the above drawbacks and to provide a novel and more practical contact arrangement for a galvanic battery.

The invention is based on the idea that on the negative side of the battery cell a tough and adhesive insulation material layer is placed outside the case of the battery cell, and collecting the current from the negative electrode takes place via at least one pin-shaped contact unit (contact member) passing through this layer of insulating material and the cover of the battery cell, penetrating into the negative electrode. Thereby the metal plate functioning as the current collecting terminal is fastened to the contact unit substantially perpendicularly as well as pressed against the layer of insulating material on the outside face of the battery cell tightly so that the fastening point between the contact unit and the metal plate functioning as the current collecting terminal is completely surrounded by insulating material.

More specifically, the contact arrangement in accordance with the present invention is characterized by an additional insulation layer that is at least on the negative side of the cell fitted onto the outer face of the case so that the contact unit, when passing through the case, first penetrates through the additional insulation layer.

By means of the invention, considerable advantages are obtained. Thus, both the current collecting terminals of single cells and the connecting in series of several cells have been achieved by means of a simplified construction, which has permitted extensively automatized production of batteries. The contact arrangement in accordance with the invention is suitable, e.g., for alkaline flat cell batteries as well as for various cylindrical cell types, such as alkaline manganese dioxide batteries as well as for so-called dry lead acid batteries The invention will be explained in more detail below with the aid of the exemplifying embodiments in accordance with the attached drawings.

BRIEF DESCRIPTION OF THE DRAWINGS

FIGS. 12 and 15 are sectional side and top views, respectively, of an alternative construction of a battery cell.

FIG. 17a–e is a sectional view as well as an exploded view of a cylindrical battery cell to which the contact arrangement in accordance with the invention can be applied.

DETAILED DESCRIPTION

Figure 1:
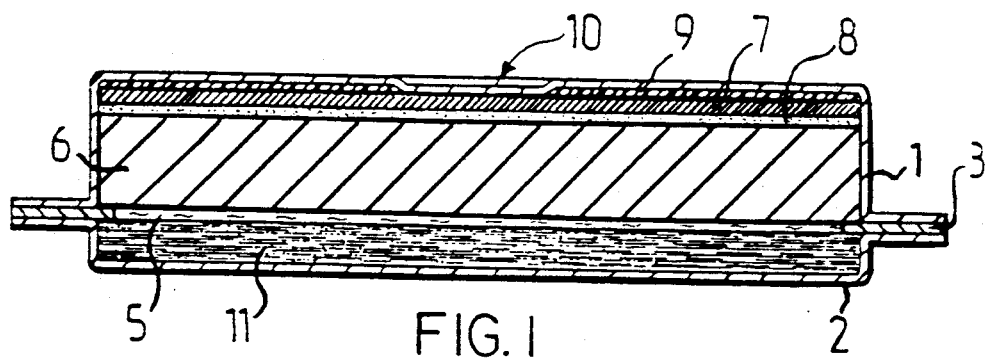
FIG. 1 is a sectional side view of a flat cell battery to which the contact assembly in accordance with the invention is applicable.
Figure 2:
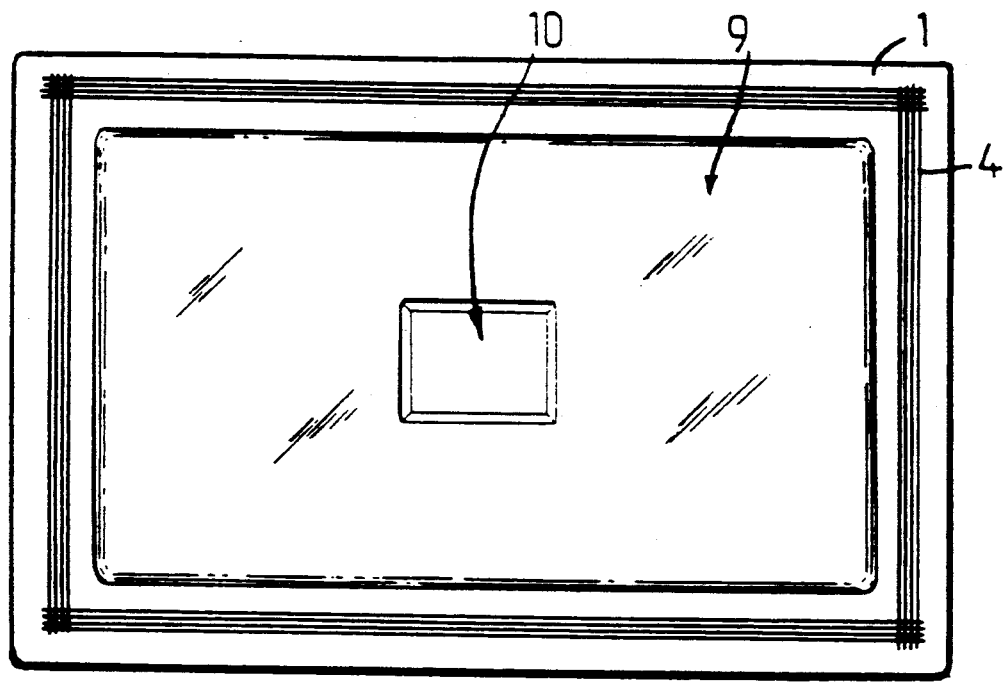
FIG. 2 is a top plan view of the cell shown in FIG. 1.

The battery cell shown in FIGS. 1 and 2 comprises a case consisting of plastics foils 1 and 2. These foils are made of polyethylene/polyamide laminate, the polyethylene being placed inside. The separator layer 5 is penetrable to ions, e.g., a non-woven felt of polyamide. The separator layer separates the positive and the negative part of the cell from each other. The edge portion of the separator layer 5 is made of heat sealable polyethylene, whereby the parts 1 and 2 of the case as well as the edge portion of the separator layer 5 are heat sealed together in a vacuum with the polyethylene layers against each other.

The positive mass tablet 6 contains, e.g., $MnO_2$ as the depolarizing agent as well as graphite as the substance conducting electrons. Moreover, it has a conventional proportion of KOH solution as the electrolyte as well as possibly a binder agent to keep the tablet compact. A metal plate 7, e.g., of iron, functions as the positive current collector. Its face placed towards the positive mass tablet 6 is coated with a protective paint layer 8 which contains carbon. The outer face of the metal plate 7 is coated with an insulating substance layer 9, which may be of a so-called hot-melt substance or of bitumen, to which additives similar to rubber have been added. The insulating substance layer 9 is of an adhesive, non-flowing and tough substance that is inert towards the electrolyte. An, e.g., rectangular empty area 10 has been allowed to remain in the middle of the insulating material layer 9.

The negative electrode 11 is a zinc mass layer which contains finely divided amalgamated zinc as well as the quantity of KOH solution required by the battery reaction as well as, in order to bind the latter colloidally, carboxymethylcellulose.

Automatic manufacture of cells of this type by using the vacuum packaging method known from the food industry can be accomplished easily. Since the cell is yet a battery as such, because it does not have the contact members needed for the current terminals. In order that an operative battery could be obtained out of the cell in accordance with FIGS. 1 and 2, the cell must be provided with such contact members.

Figure 3:
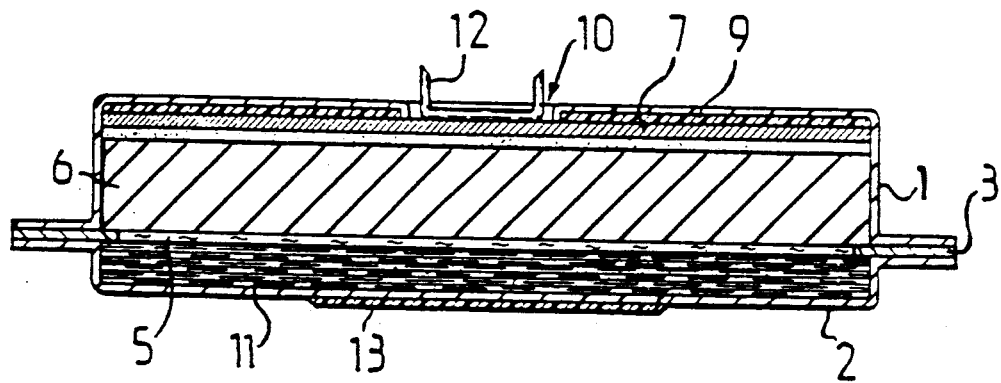
FIGS. 3 and 4 show a cell in accordance with FIGS. 1 and 2 with one layer of insulation and contact unit in accordance with the invention installed in position.
Figure 4:
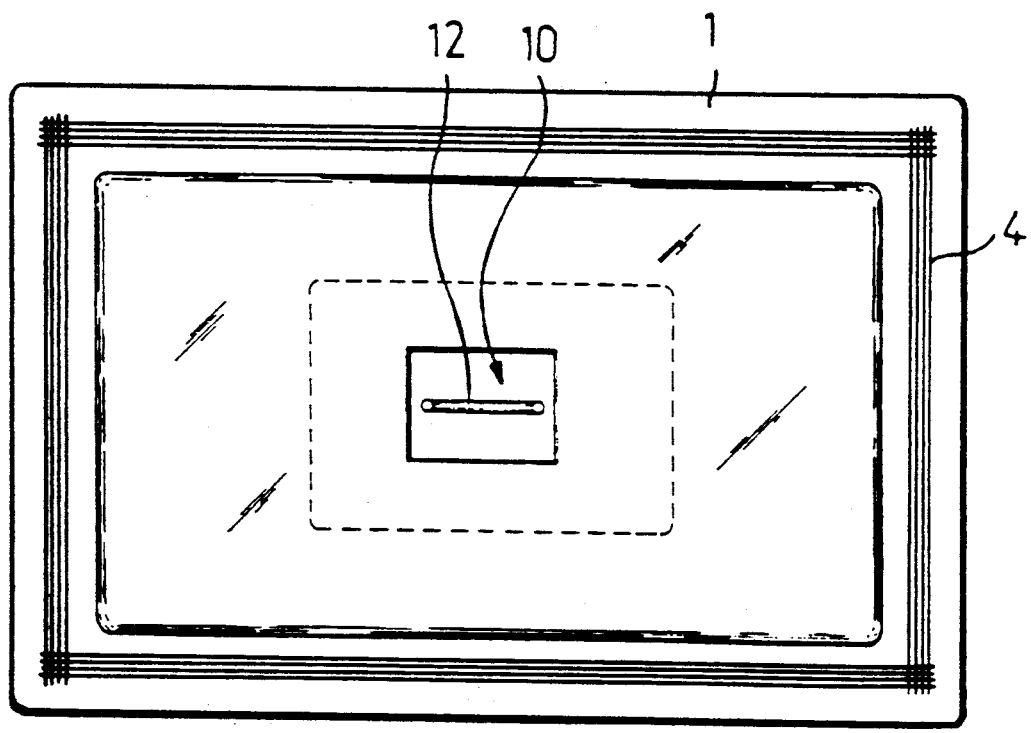

In FIGS. 3 and 4 it is shown how contact can be made to the positive current collector 7 by removing the part 10 of the cover 1 that is not in contact with the insulating material 9. To the metal face in this way uncovered, an, e.g., U-shaped contact member 12 comprising two pins is fastened. This member may be, e.g., of copper, brass or zinc-coated iron. It can be fastened by means of spot-welding or soldering onto the current collector plate 7. Before the battery is assembled, an insulating layer 13 of a tough, adhesive substance is fitted onto the negative side of the cell, which layer secures the tightness of the battery sealing in and after the final assembly stage. This layer may be of the same substance as the layer 9 mentioned above.

Figure 5:
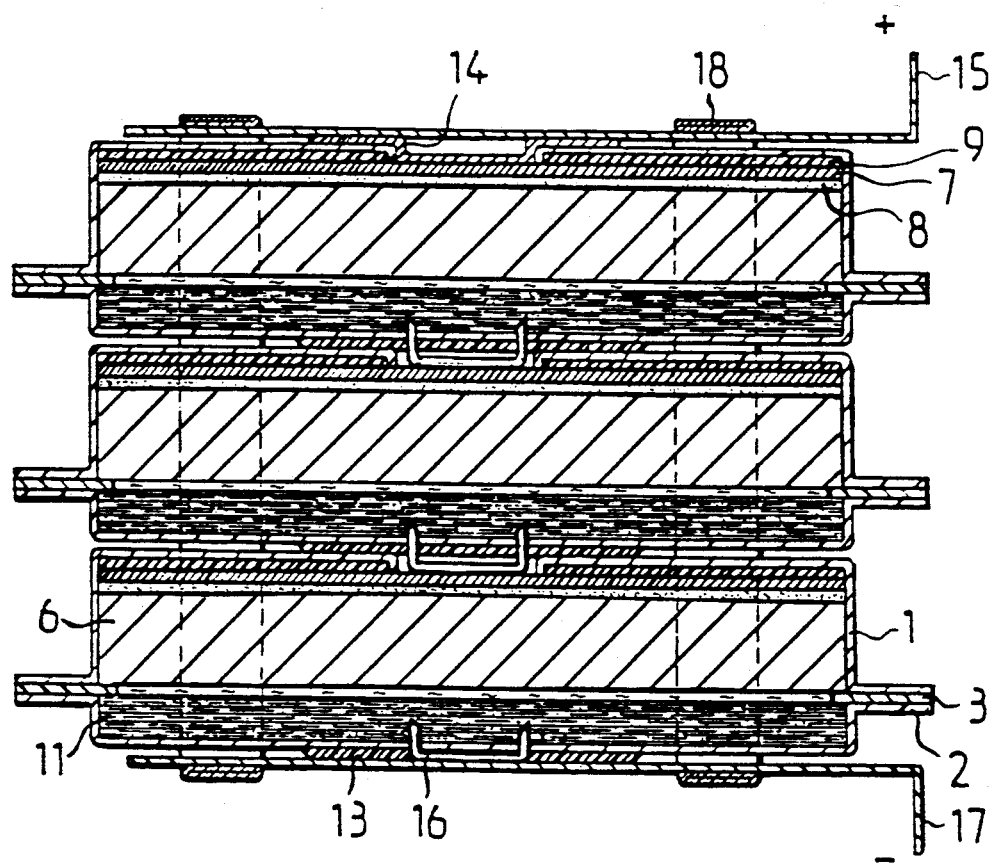
FIG. 5 is a sectional side view of a battery assembled out of three cells.

FIG. 5 shows a battery assembled out of three cells of the type described above, the lowest two cells being in accordance with FIGS. 5 and 4, but the contact piece 14 of the upper cell being preferably made of thin steel sheet which is by spot-welding fastened to the positive current collector plate 7. One side of this contact unit 14 is in contact with the positive current collector terminal 15 of the battery.

The negative contact member 16 is, on the other hand, e.g., by spot-welding fastened to the negative current collector terminal 17. The cells are pressed together by means of rubber rings 18.

As has become apparent, the contact pins penetrating into the negative electrode 11 are surrounded with an insulation layer 15 placed outside the cell so that any leakage is totally excluded. At the same time the cells, when they are pressed together, are glued against each other with the aid of the insulation layer 13 placed on the negative side of each cell so that the battery forms a fixed block. The space required by the contact arrangement as compared with the total volume of the battery is negligible. Moreover, the electrical contact between the cells is highly reliable, and the contact remains good even despite mechanical vibrations.

Figure 6:
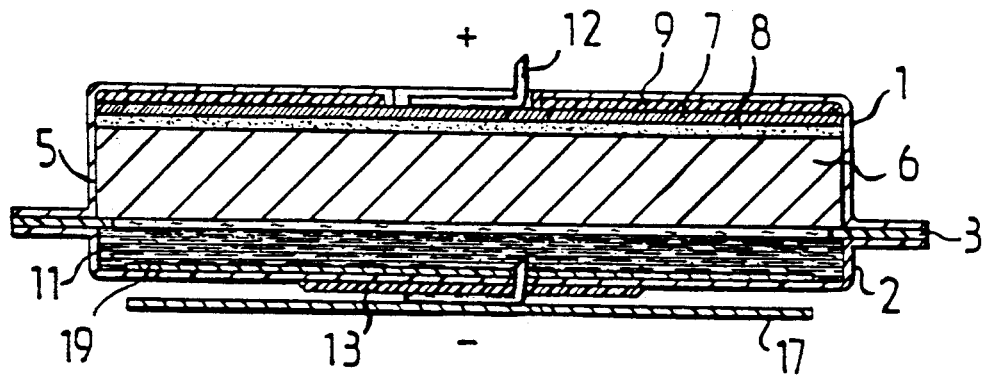
FIGS. 6 and 7 are sectional side views of a second embodiment of an arrangement in accordance with the invention.
Figure 7:
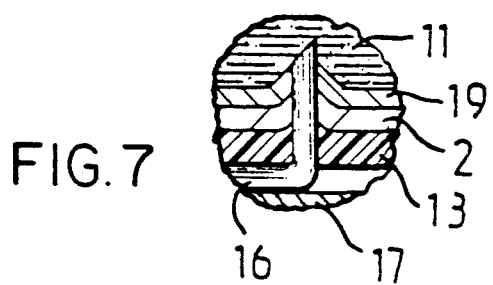
Figure 9:
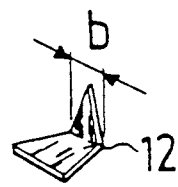
FIGS. 9, 10 and 11 show details of the construction in accordance with FIG. 8.
Figure 8:
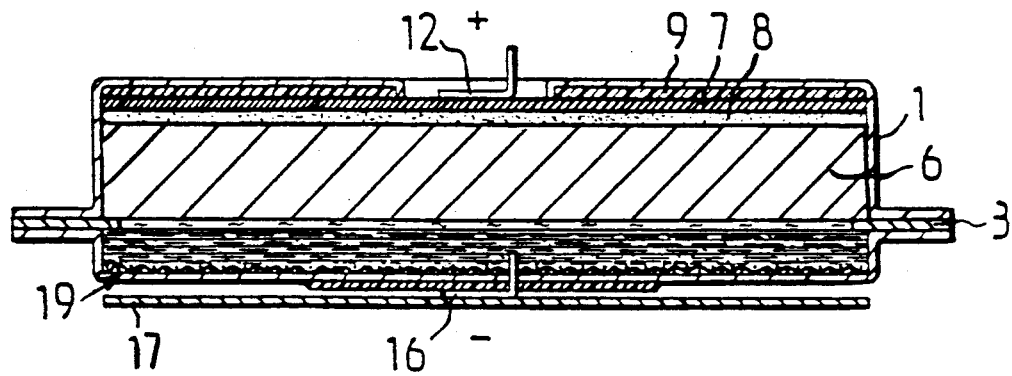
FIG. 8 is a sectional side view of a third embodiment of an arrangement in accordance with the invention.

FIG. 6 and the related detailed illustration of FIG. 7 show a variation of the contact arrangement described above, which variation is particularly suitable for thin-cell batteries as well as for batteries that are discharged with high currents. In this construction the contact members 12 and 16 are made of copper wire, and the contact members may have, e.g., only one pin. When the battery is being assembled, this pin penetrates through a thin copper foil 19 placed under the negative electrode mass 11, as indicated more clearly by the enlarged detailed view in FIG. 7. Thereby a very good electrical contact is formed with the copper sheet 19 functioning as the negative current collector. Under these circumstances, the current density between the positive and the negative current collector of the cell can be made homogeneous, and quite strong currents can be obtained from the battery. It is clear that, by piling such cells one upon the other, it is possible to obtain a battery of any desired voltage.

Being perpendicular to the face of the next cell when the battery is being assembled, the pin penetrates first through the layer 15 of insulating material and thereupon through the cover 2 so that the vacuum prevailing in the cell itself is maintained. When the cells are pressed against each other, this insulating layer 15 maintains the battery hermetically sealed.

Figure 10:
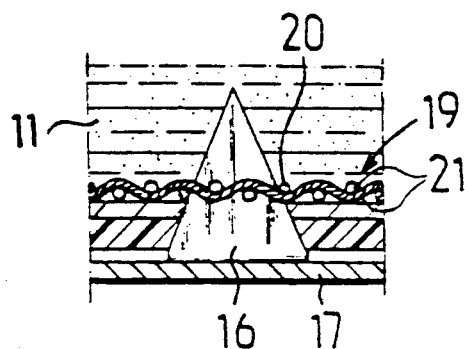
Figure 11:
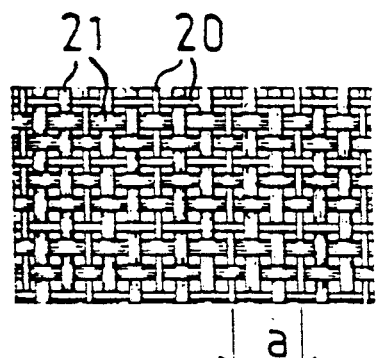

FIGS. 8 to 11 show a variation of the solution of FIGS. 6 to 7, said variation being applied to a solution in accordance with the Finnish Patent Application No. 810552. In this case, the negative current collector 19 comprises a net consisting of copper wires 20 and of plastics fiber yarns 21. Thus, a plastics fabric 21 is connected with the copper-wire current collector 19, said fabric 21 functioning as an additional container of electrolyte. The contact member 12 may in this case be triangularly expanding in the way shown in FIG. 9 in order that, when it penetrates through the current collector net 19, electrical contact should be formed with the copper wires 20, as illustrated by FIG. 10. The triangular tip is, when penetrating into the net 19, spread into contact with the copper wires 20. Under these circumstances, as shown in FIG. 11, the base b of the triangle must be at least equal to the distance a between the copper wires 20 in the fabric.

Figure 12:
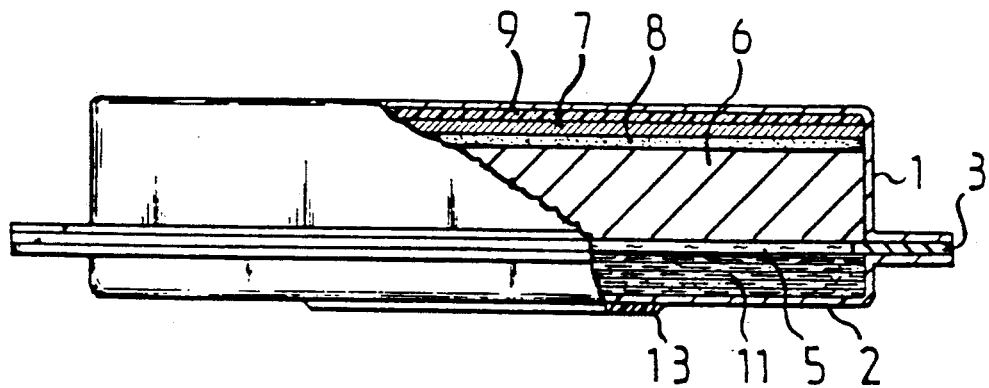
Figure 13:
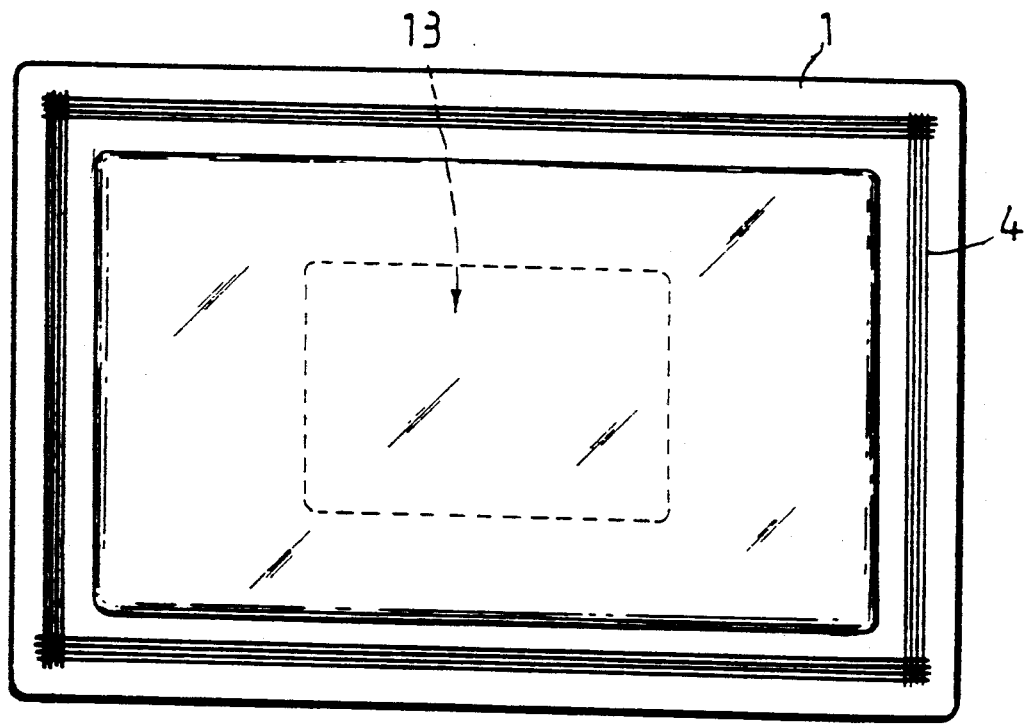

FIGS. 12 and 13 show a cell construction in accordance with FIGS. 1 and 2, except that the layer 9 of insulating material spread onto the outer face of the positive current collector 7 is uniform (thus, it has no opening). In this case, when an arrangement in accordance with the invention is applied, separate contact units must be used.

Figure 14:
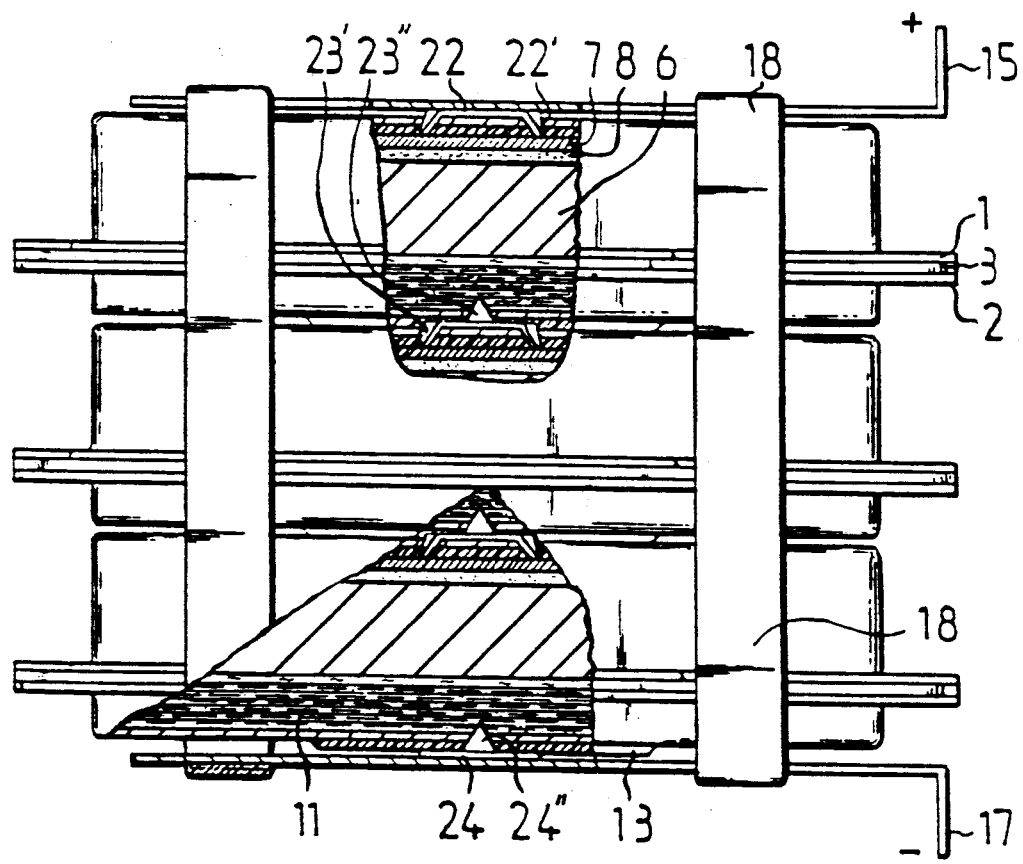
FIG. 14 is a sectional side view of a battery consisting of three battery cells in accordance with FIG. 12.
Figure 15A:
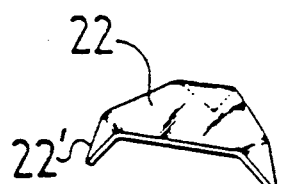
FIG. 15a–c shows contact units to be used in a battery in accordance with FIG. 14.
Figure 15B:
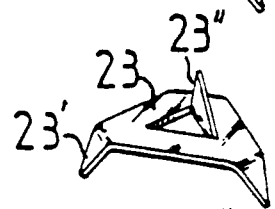
Figure 15C:
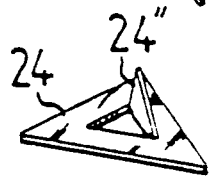
Figure 16A:
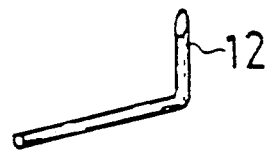
FIG. 16 shows contact unit solutions to be used in the contact arrangement in accordance with the invention.
Figure 16B:
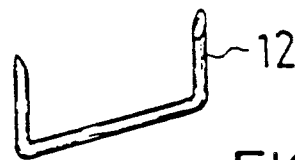
Figure 16C:
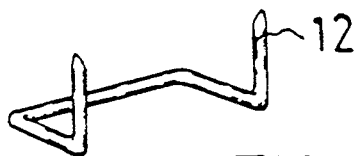
Figure 16D:
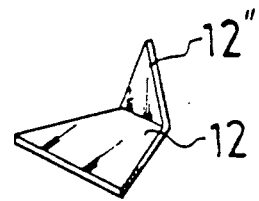
Figure 16E:
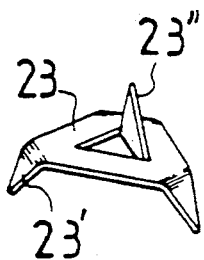
Figure 16F:
Figure 16G:
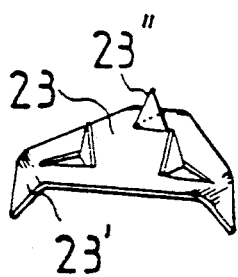
Figure 16H:
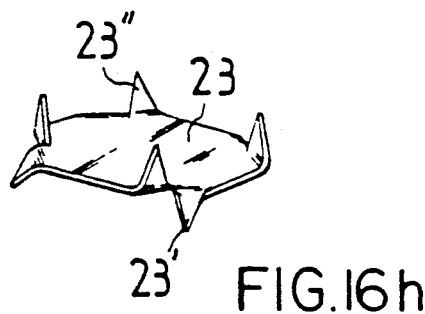

FIGS. 14 and 15 show a solution of this type, whereby it is noticed that contact constructions 22, 23, 24 of three sorts are needed, which are illustrated as solutions of principle in FIG. 15. In the positive contact unit 22 pins 22' bent only in one direction downwardly are needed. In the contact units 25 placed between cells, pins 23' and 23" pointing in two directions are needed in order to accomplish connecting in series. In the contact unit 24 of the negative terminal 17 there is only a pin 24" penetrating into the negative electrode 11.

For the sake of clarity, the contact units shown in FIGS. 15 are presented caricaturally. It is to be noticed that, since the layer 9 of insulating material and the cover layer 1 in connection with the positive current collector 7 are thin, the pin-shaped tips 21' and 25' are in reality very short as compared with the pins 25" and 24" penetrating into the negative electrode.

FIGS. 16$a$ to $d$ show examples of contact units to be fastened to the positive current collector, e.g., by spot-welding (FIGS. 1 to 11).

On the other hand, FIGS. 16$e$ to $h$ show examples of various contact units provided with pins 23' and 23" pointing in two directions.

In FIG. 17 it is shown how the invention can be applied to cylindrical battery cells. In this case the cell comprises a cylindrical plastics case provided with a rather thick mantle portion 101 and a rather thin bottom portion 102. The mantle portion 101 extends like a collar (101') to underneath the bottom portion 102. Inside the plastics case 101, 102 a cylindrical positive current collector 107 is fitted whose inside face is provided with a protective paint layer 108. A toroidal piece 106 pressed out of the depolarizing mass is fitted in direct contact with the protective paint layer 108.

A negative electrode mass ill, all over surrounded by a a separator layer 105 like by a bag, is shaped as a cartridge filling the cylindrical space inside the depolarization piece 106. The positive current collecting terminal 115 closes the cylindrical case 101 tightly while being pressed at its edges into contact with the upper edge of the positive current collecting cylinder 107. The plastics case 101 has been heat-formed hereinafter over the edges of the terminal 115, whereby it has been possible to close the battery tightly.

The negative current collecting terminal preferably comprises a nickel-plated iron plate 117, to which a pin-shaped contact piece 116 has been fastened, e.g., by welding. The bottom face of the bottom portion 102 of the plastics case is coated with a layer 115 of viscous, adhesive insulating material, whereupon the pin-shaped contact unit 116 can be pushed through the insulating material layer 113, the bottom portion 102 of the plastics case, and through the separator layer 105 axially so that it penetrates into the negative electrode mass 111. Thereby the flange-shaped part 117 is pressed tightly onto the layer 113 of insulating material, whereupon the collar part 101' is heat-formed inwards over the edge of the mantle portion 117, whereupon the battery is complete.

In order to exclude any short circuit, the inside of the projecting part 115' of the positive current collecting terminal 115 may be filled with an insulating material 125, e.g. with bitumen.

The battery may additionally, in the conventional way, be closed with a steel jacket.

Figure 18:
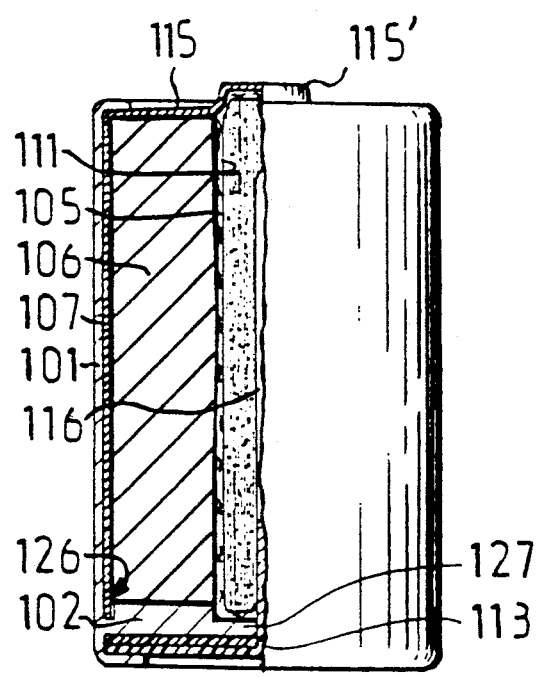
FIG. 18 is a sectional view of an alternative cylindrical battery cell construction.

FIG. 18 shows a solution alternative to FIG. 17, in which solution the positive current collecting terminal 115, 107 at the same time functions as the positive current collector while extending right into the bottom portion 102 of the plastics battery case 101. This is provided with a groove 126 of the shape of a cylinder ring so as to receive the bottom edge of the cylindrical current collector 107. The center of the bottom portion 102 is provided with a thinner portion 127 in order to facilitate the passing through of the pin-shaped contact unit 116. In other respects the construction is in accordance with FIG. 17.

It should be noticed that the idea in accordance with the invention is, differing from the exemplifying embodiments described above, of course, also applicable to the positive side of a battery cell.

What is claimed is:

1. Contact arrangement for a battery cell of a galvanic battery comprising
   (a) a positive mass layer;
   (b) a negative electrode layer;
   (c) a separator layer arranged between the positive mass layer and the negative electrode layer so as to separate each from the other;
   (d) a positive current collector connected to the positive mass layer;
   (e) a case of an insulating material which hermetically encloses the active components of the battery cell in a vacuum;
   (f) contact units to create contact through the case with the positive current collector and with the negative electrode layer, respectively, and
   (g) at least one additional insulation layer of a tough and adhesive material and which is limited by the case, so as to maintain the hermetic nature of the case despite the passing-through of the contact unit, wherein the additional insulation layer is at least on the negative side of the cell fitted onto the outer face of the case so that the contact unit, when passing into the case, first penetrates through the said additional insulation layer in a hermetic engagement with the additional insulation layer so as to maintain the vacuum in the cell.

2. A contact arrangement as claimed in claim 1, wherein the contact units comprise separate units.

3. A contact arrangement as claimed in claim 1, wherein the contact units each comprise a plate-shaped portion functioning as a current collecting terminal and at least one pin-shaped structure projecting from its plane at least substantially perpendicularly.

4. A contact arrangement as claimed in claim 3, wherein, when the contact unit is in its position, its pin-shaped structure is circumscribed by the additional insulation layer.

5. A contact layer as claimed in claim 1, further comprising a negative terminal of the battery electrically connected to the negative electrode layer, and wherein the contact units are permanently fixed to one of the positive current collector of the cell and the negative terminal of the battery.

6. An alkaline battery comprising at least one battery cell having the contact arrangement according to claim 1.

7. The alkaline battery according to claim 6 wherein said alkaline battery is an alkaline flat cell battery.

8. The alkaline battery according to claim 6, wherein in said alkaline battery comprises at least two battery cells and the adjacent outer faces of the cases of the cells through which the contact units pass are adhered together.

9. The alkaline battery according to claim 8, wherein said alkaline battery is a small size alkaline flat cell battery.

10. An element of a flat alkaline cell comprising a plastic sheet for a cell envelope wall, a metal collector plate having its major surfaces coextensive with the flat dimensions of said cell, a metallic connector, a fused metallic bond between said plate and said connector on a central portion of a first major surface of said plate, a coating of a material which is adherent to the metal of said plate and is resistant to attack by potassium hydroxide on said first major surface of said plate coextensive with and bonded to said first major surface of said plate over essentially the entire surface surrounding said connected bond, and bonded to said plastic sheet over an area essentially coextensive and in registry with said first major surface of said plate, said sheet having a passage for said connector and said connector passing through said sheet at the central portion of said plate, whereby essentially the entire lateral extent of said coating on said plate seals against the flow of potassium hydroxide to be contained within the cell to said passage in said envelope sheet.

11. A combination according to claim 10 wherein said coating is an elastometric hot melt.

* * * * *